United States Patent [19]

Ferriss

[11] 4,068,533
[45] Jan. 17, 1978

[54] ESG REFLECTED IMPEDANCE PICKOFF

[75] Inventor: Lincoln Stark Ferriss, Lincoln Park, N.J.

[73] Assignee: The Singer Company, Little Falls, N.J.

[21] Appl. No.: 746,041

[22] Filed: Nov. 30, 1976

[51] Int. Cl.² .............................................. G01C 19/28
[52] U.S. Cl. .................................. 74/5.6 D; 74/5 R; 74/5.8; 74/5.42; 308/10; 73/517 B
[58] Field of Search ...................... 74/5, 5 R, 5 F, 5.1, 74/5.37, 5.4, 5.41, 5.42, 5.5, 5.6 A, 5.6 B, 5.6 C, 5.6 D, 5.6 E, 5.6 R, 5.7

[56] References Cited
U.S. PATENT DOCUMENTS

3,902,374  9/1975  Hoffman et al. ................... 74/5.6 D

Primary Examiner—Samuel Scott
Assistant Examiner—Don E. Ferrell
Attorney, Agent, or Firm—L. A. Wright; T. W. Kennedy

[57] ABSTRACT

An electrostatic pickoff well suited for use in a two-axis electrostatically-captured rotor rate gyroscope is shown. Displacement currents, which flow between stator electrodes and the V-shaped annular electrically conductive rotor capturing the rotor, are processed so as to produce signals related to rotor position but independent of capture currents. When closed through a 5 degree-of-freedom positional servomechanism, rotor position signals are effective in producing rotor capture with net zero rotor current without producing rotor distorting forces.

14 Claims, 8 Drawing Figures

HIDDEN ELECTRODE IS $E_{OYO}$

$\phi = \text{TAN}^{-1} QP$ $$\frac{d\phi}{d(QP)} = \frac{1}{(1+QP)^2}$$

ESG REFLECTED IMPEDANCE PICKOFF

This invention is related to a captured type two-axis gyroscope. More particularly, this invention is related to an electrostatic gyroscope (ESG) having reflected impedance pickoff means, designed for but not limited to applications in a strapped down inertial navigation system.

BACKGROUND OF THE INVENTION

In the U.S. Pat. No. 3,902,374 assigned to the same assignee as the present invention, there is disclosed a captured type two-axis gyroscope which has a Saturn-Shaped rotor disposed within an evacuated housing. In that invention, an electrostatic rotor suspension system is utilized to provide frictionless rotor spin bearing. Those electrostatic forces associated with suspension are applied to the spherical portion of the rotor and pass essentially through the center of the rotor and thus, by design, produce no torques on the rotor. Those electrostatic forces producing angular capture are applied to the ring structure portion of the rotor by capture electrodes mounted on a cup-shaped support member which has limited rotational movement about two perpendicular axes that are parallel to the gyroscope precession axis. A pair of vibrating beam force transducers are connected between the support member and the housing to sense the reaction torque exerted by the capture system so that the reaction torque exerted by the capture system provides two axis rate output signals.

The approach of the present invention is through the use of the captured-type rotor rather than a free rotor gyro for two important reasons. First, every free gyro with extremely wide angle capabilities requires a wide angle pickoff capable of precise and fine angular resolution. Most transducers which have been developed in this area have been complex, cumbersome and expensive. The second reason for avoiding the free gyroscope approach is that the restraints on free gyroscopes generally change with angular position of the rotor. In the case of electrostatic gyroscopes torques appear on the rotor as a result of deviation from perfect rotor sphericity. If the gyro has a very limited angular freedom it is possible to achieve very good performance through cancellation of restraints throughout the suspension system. This is impossible over wide angles. Therefore, the free gyro requires better geometrical control and also more extensive testing than a captured gyro.

BRIEF DESCRIPTION OF THE INVENTION

The gyro of the present invention is simplified by combining the functions of the spin bearing and the capture system. The rotor is in the form of a ring with a "V"-shaped cross section, the apex of which is pointed at the center of rotation. This shape provides a more favorable inertia to weight ratio than the flanged sphere described in the abovementioned. invention. Disposed within the rotor toward the center of the system is "an electrode structure" complementary in shape to the rotor and separated from it by a gap. The electrode structure is supported by a two degree-of-freedom flexure and constrained from tilting by a pair of vibrating beam force transducers.

Arranged about the surface of the electrode structure adjacent to the inner surfaces of the rotor is a set of electrodes. Electrostatic forces acting normal to the surface of the rotor produce both translational and rotational components by virtue of the geometrical design of the system. Consequently, the torquer cup of the previous invention is eliminated and a more efficient rotor is incorporated in the instant invention.

In prior art devices, separate electrodes were provided for the purposes of excitation, displacement sensing, capture and torquing. In the present invention, each capture electrode is operated from an a-c current-source circuit providing an electrostatic force on the rotor effecting rectilinear and angular capture. Positional changes of the rotor alter the gap separation and therefore the electrical capacitance which is inversely related to the gap. This impedance change results in a voltage change which, after processing, yields a signal related to displacement of the rotor along the axis of that electrode. The very current producing the force is also effective in producing a displacement-related signal removing the need for electrodes dedicated to separate functions. In that manner, each of the electrodes contributes the functions previously provided by separate electrodes.

Whereas in prior art ESG devices zero induced rotor voltages was attained by splitting each suspension electrode into equal halves and operating with equal but opposite voltages, in the present invention are instantaneous sum of the electrode currents is zero. Since the rotor is an electrode common with the suspension electrodes, the net current to the rotor is zero and thus, the rotor voltage is also zero.

Accordingly, it is an object of this invention to provide a simplified and more economic system wherein the functions of spin bearing and angular capture are combined at the electrode.

It is another object of this invention to provide for excitation, sensing and forcing with an electrode set wherein the functions when considered alone are not dedicated to any electrode or set of electrodes.

It is a further object of this invention to provide a means to measure the effect of rotor displacement in the presence of force-producing currents at an electrode without disturbing the force produced and process that effect so as to produce an output signal related to rotor displacement.

It is yet a further object of this invention to provide an electrostatic gyroscope wherein the rotor is an electrode common with the suspension electrodes causing net current to the rotor to be zero and thus, the rotor voltage is also zero.

These and other objects and advantages will be more readily understood by those skilled in the art after a detailed consideration of the following specifications taken in conjunction with the accompanying drawings (not to scale) wherein:

Figure 1:
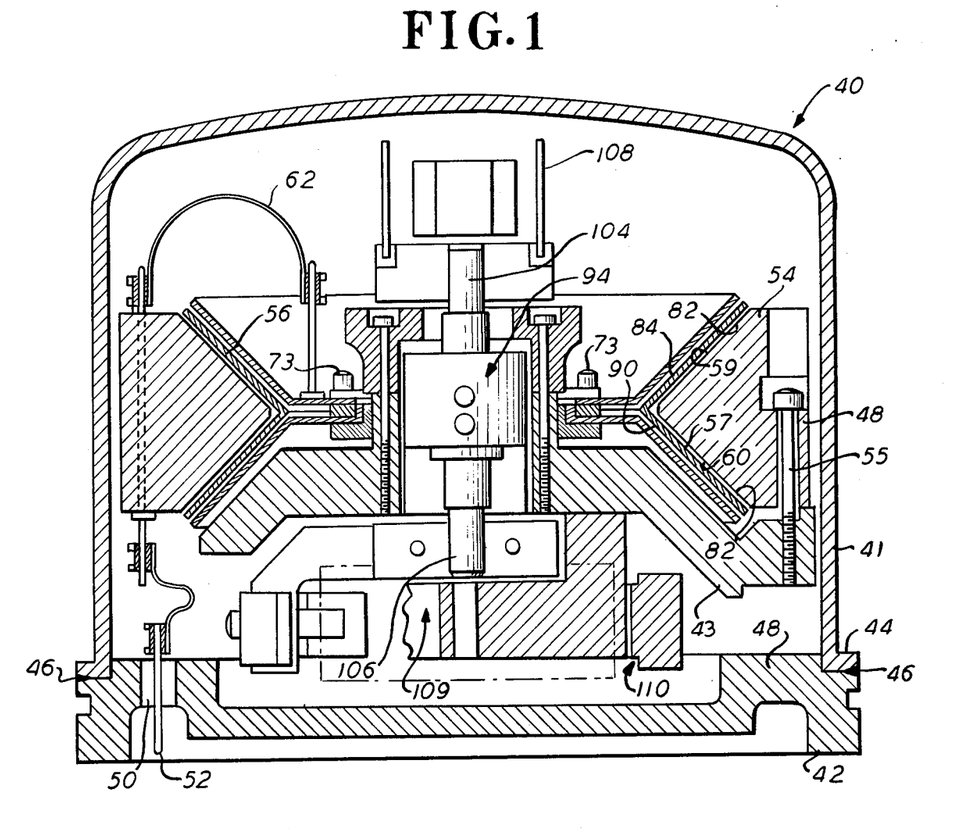
FIG. 1 is a sectional view in elevation of the electrostatic gyro of the invention.
Figure 2:
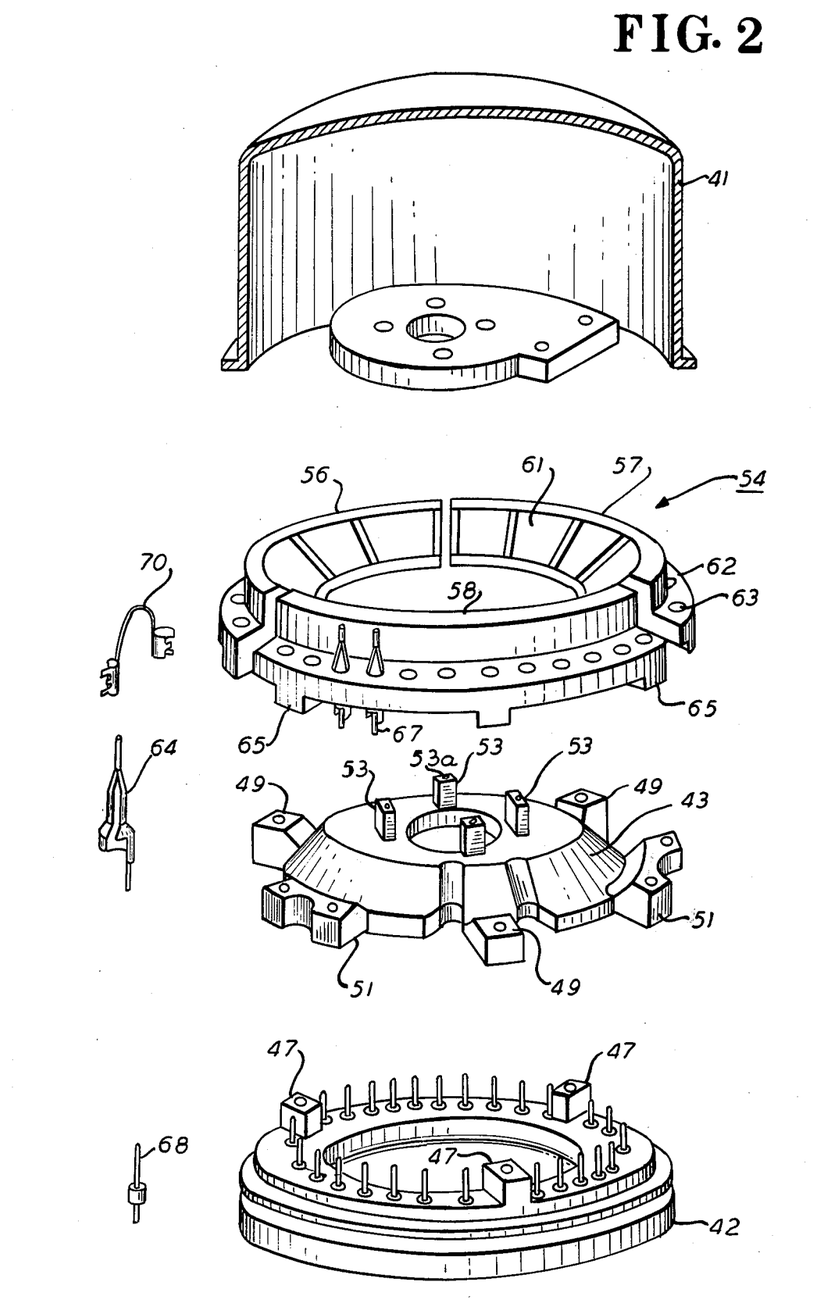
FIG. 2 is an exploded view in persepctive of the gyro mounting bases, spin stator and cover.

In FIGS. 1 and 2 the physical arrangement and assembly of the ESG of the invention is shown. The gyro as illustrated is a two-axis rate gyro. It comprises a gyro proper 40, which is positioned within a housing including an upper portion 41 secured in airtight fashion to a mounting base 42. Both the housing and the base are manufactured from stainless steel. A suitable method for effecting an airtight seal is to weld the flange portion 44 to a suitable ledge formed in the base 42 at the seam 46. The base 42 includes a plurality of openings (not shown) disposed circumferentially about the flange portion 48. Inserted in these openings are glass headers 50 which include a pin 52 positioned on the longitudinal axis of the header 50. Each of the glass headers 50 are sealed in the openings in a manner known in the art so as to maintain the airtightness of the enclosure defined by the housing 41 and mounting base 42.

Positioned axially above the mounting base is the spin up stator mounting base 43. The base 43 preferably is made from beryllium copper. As best seen in FIG. 2, the stator mounting base 43 includes a set of radially and axially extending appendages 49. Appendages 49 cooperate with mounting bosses 47 on mounting base 42 for mounting the spin up stator mounting base. The stator mounting base also includes a set of radially extending appendages 51 and a set of axially extending appendages 53 each of which includes mounting holes 53a therethrough for securing various components of the gyro thereto.

Positioned axially above the spin up stator mounting base as viewed in the drawing is the spin up stator 54. The spin up stator is preferably fabricated from aluminum oxide and includes in a preferred embodiment three sections 56, 57 and 58 which are substantially identical to each other and which when placed together form a circular stator used in spin up of the rotor of the gyro to its operating speed.

As best seen in FIG. 1, each of the sections of the spin up stator 54 in cross section is formed into a wedge shaped configuration with the point of the wedge positioned radially inwards from the base of the wedge. The wedge shaped stator includes two radially inwardly facing surfaces 59 and 60. Each of the faces contains a predetermined number of substantially rectangular shaped electrodes shown typically at 61 in FIG. 2. These can be formed by plating the corresponding surfaces with nickel or similar electrode material.

Referring again to FIG. 2, extending circumferentially around each stator section is a flange 62. Each flange includes a plurality of openings 63 extending in a circumferential fashion along the flange and passing therethrough. Positioned on the underside of flange 62 are mounting bosses 65 which are positioned upon and secured to stator mounting base 43 when the unit is finally assembled to the corresponding radial appendage 51 on stator mounting base 43. Suitable means for securing the sections of the spin up stator to its mounting base 43 is shown typically at 55 in FIG. 1.

Referring again to FIG. 2, inserted through each of the openings 63 are insulating socket inserts 64. The socket insert includes a cylindrical tube which extends the actual length therethrough and into which a pin 67 of sufficient length is inserted. The diameter of the cylindrical opening 63 is such that the pin once positioned in the insert is held securely. Pin 67 is connected at its lower end to pin 68 via a flex lead clip contact shown at 70. Similarly, a flex lead clip arrangement 70 is employed at the upper end of pin 67 connected to stator electrode. Through this pin flex clip arrangement electrical connections are made between the spin up and suspension stator and corresponding points outside of the gyro.

Figure 3:
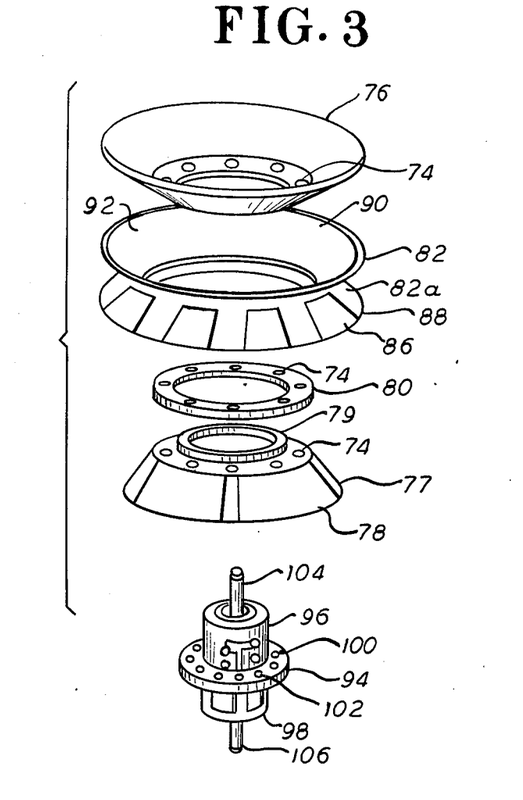
FIG. 3 is an exploded view in perspective of the rotor-electrode assembly.

FIG. 3 shows an exploded perspective view of the suspension stator and rotor assembly. The stator includes top and bottom disc shaped suspension stator halves 76 and 77. Each of the suspension stator halves are fabricated from aluminum oxide and have deposited thereon in the preferred embodiment four suspension electrodes 78. These electrodes like the electrodes deposited on the spin up stator are preferably nickel plated electrodes.

The lower suspension stator 77 includes an annular alignment flange 79 about which ring collar or shim 80 is placed. Collar 80 of varying axial width acts as a shim to provide the necessary gap spacing between the suspension stator halves and the rotor. The two halves of the suspension stator 76 and 77 and shim 80 contain a plurality of through holes 74 which enable the unit to be held together by screw means 73 as shown in FIG. 1. Prior to assembly, the gyro rotor 82 is interposed between the two halves of the suspension stator. Rotor 82 has the shape of two truncated cones or frustrums which are joined at the point of truncation. The rotor is manufactured typically from beryllium. The outside periphery of the rotor defines a V-shaped surface in cross section which opens in a radially outward direction. The V-shaped opening is dimensioned so as to allow for the nesting of the wedge shaped portion of the spin up stator 54, and when properly aligned, the gap 84 between the surfaces 82a, 59 and 60 is in the order of .001 inch.

The rotor surface 82a comprises an alternating pattern of notches 86 and high points 88, which are related in dimension and number to the electrodes 61 located on the surfaces 59 and 60 spin up stator 54. The combination of depressions 80 and elevations 88 and electrodes 61 comprise the rotor and stator of an electric motor which operates according to the principles described in U.S. Pat. No. 3,951,000.

Contained centrally within the gyroscope is a universal joint type flexure coupling 94. The coupling comprises two such joints or flexure hinges of the type described in U.S. Pat. No. 3,354,726. The inner gimbal of each of the flexure units 96 and 98 are connected to a mounting flange 100 which includes a plurality of openings 102 which enables the flange 100 to be secured to the suspension stator assembly via openings 74 in the suspension stator halves 76 and 77 and shim 80. The outer gimbal of the flexure units are connected to corresponding shafts 104 and 106. The shafts are connected respectively to four measuring transducers identified generally as 108 and 109 in FIG. 1.

Within each of the two flexure joints is a pair of hinges oriented in quadrature with one another. Each pair is compliant in one linear direction. When the two pairs are rotated 90° with respect to each other on each axis, the soft direction of one hinge pair is reinforced by the stiff direction of the other hinge pair. Then a linearly stiff suspension results which permits rotational compliancy about the two perpendicular axes of the hinge (these two are parallel to the precession axes of the gyroscope). The reaction torques exerted about the X and Y gyroscope axes are sensed by their corresponding force transducers 108 and 109 placed in a quadrature relationship to each other so as to measure restoring force along axes perpendicular to each other. Each of the force measuring transducers 108 and 109 are secured to the gyro housing formed by the cover 41 and mounting base 42 in a suitable manner. Their ability to measure restoring force is based on the same principle and techniques in the force measuring system associated with U.S. Pat. No. 3,902,374.

The flexure hinge assembly 94 rigidly supports the rotor electrode assembly in translation by virtue of its own stiffness. High rotational compliance permits gyroscopic forces to act on force transducers 108 and 109 which constrain rotational motion.

Figure 4:
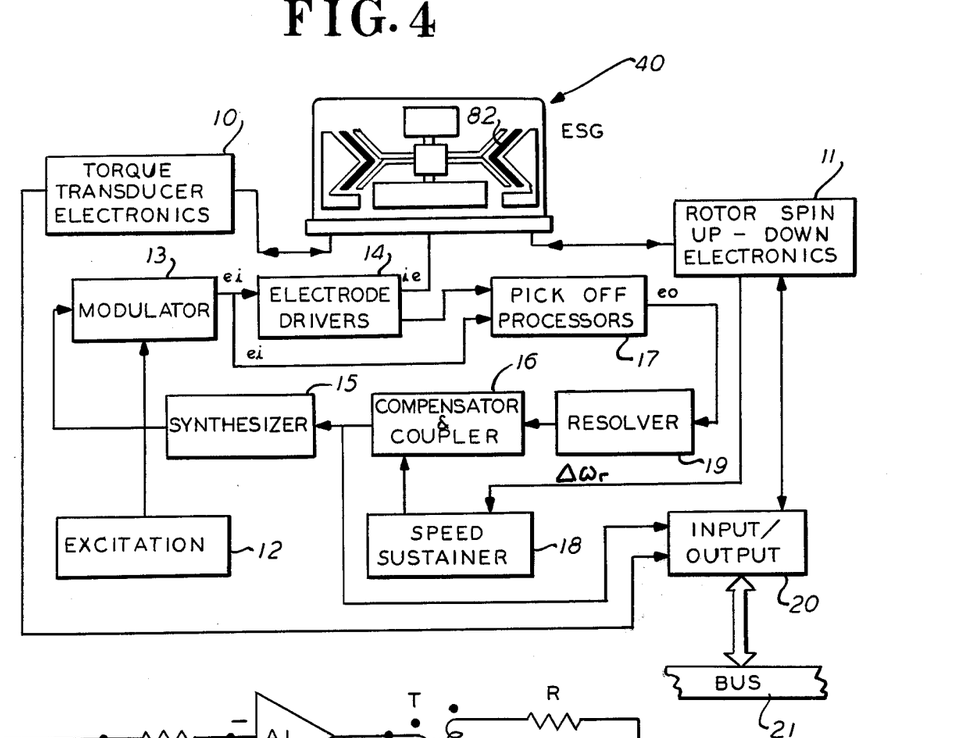
FIG. 4 is a block diagram interrelating the ESG and associated electronics.

Referring to the schematic block diagram of FIG. 4, a better understanding of the relationships between the mechanical and electronics portions of the ESG may be gained. The ultimate purpose of ESG 40 is to provide digitized angular rate information to a computer (not shown) within the vehicle in which the guidance or navigation system is housed. The torque transducer electronics 10 contain the oscillator electronics required for the operation of the vibrating beam force transducers and the frequency differencing circuitry producing pulse trains indicative of input angular rate about two axes of input. These rate data are transmitted to the computer via the input/output circuit 20 and a vehicle data bus 21.

Figures 5, 6:
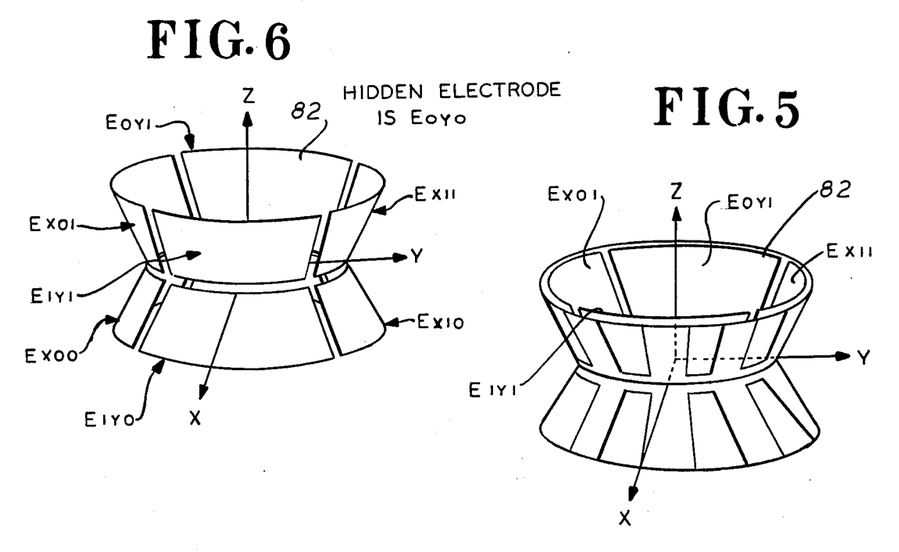
FIG. 5 is a perspective idealized view of the rotor-electrode assembly.
FIG. 6 is a perspective view identifying the system of capture electrodes.

The rotor 82 is captured above five of the six natural axes. In FIG. 5, rotor 82 is shown with four interior capture electrode surfaces ($E_{0y1}$, $E_{x01}$, $E_{1y1}$ and $E_{x11}$) visible. The remaining four are located in similar image about the interior of the lower half of the rotor, and are blocked from view by it. At the geometric center of this system is the origin of a mutually orthogonal coordinate system. The rotor is captured along each of the axes for rectilinear displacements. The X and Y axes are aligned with the precessional axes of the gyro and the rotor is captured rotationally about these axes. The Z axis is colinear with the spin reference axis of the gyro. The rotor is free from capture by the direct action of the capture servos operating in conjunction with the interiorly located capture electrode surfaces. During normal operation, the rotor is spun from zero to operating angular velocity of 2,560 revolutions per second by set of electrodes on the spin up stator located radially exterior from the rotor. Circuits of block 11 perform the spin up and spin down function. Upon attaining spin up, torque is removed and sustaining torque from block 18 is provided to the rotor through the action of the X and Y axes displacemental capture servo.

Sustaining torque is applied to the rotor through the action of a closed-loop (portions contained in block 11, 16 and 18) rotor speed control system. The amount of torque necessary to sustain the rotor at operating speed is small since only small losses are incurred due to residual gas molecules producing viscous drag torques on the rotor.

An error signal $\Delta\omega_r$ representing the difference between desired rotor speed and actual rotor speed is generated in block 11 and applied to block 18. Means for the generation of an error signal are described in U.S. Pat. No. 3,951,000. Within each X and Y axes displacemental capture servo there are at least one single pole low-pass active filter, the cutoff frequency of which is controlled by the error signal $\Delta\omega_r$. Those skilled in the art of nonlinear analog circuit design recognize that such variable pole active filters can be constructed using operational amplifiers with analog multipliers included as part of the amplifier feedback network. The range of the cutoff frequencies is normally beyond the bandwidth of the X and Y axes displacemental servos and thence their effect is to vary the amplitude and phase of displacemental error signals at frequencies beyond those effective in rotor capture.

Such high frequencies at 2,560 Hz do exist; however, because of an intentionally small and predictable misalignment between the center of volume and the center of mass of the rotor (both of which by design lie in a plane perpendicular to the spin reference axis), at normal operating speed, the rotor tends to spin about an axis falling between the two and closer to the mass center causing a rotor wobble having an amplitude approaching that of the intended eccentricity. The effect of the wobble which occurs at rotor spin frequency is to generate displacemental error signals within the lateral servos which are modified by the frequency- and phase-response characteristics of the active filters prior to being applied as electrode currents.

Because electrostatic lines of force act normal to the electrically conductive rotor, net lateral force vectors pass through the center of volume. There exists a lever arm approximately equal to the separation between the centers of volume and mass. Thus, forces in the X-Y plane due to currents at rotor frequency act in the same plane as the lever arm and produce torques about the spin axis. The magnitude of the torque is related trigonometrically with the phase and directly with the amplitude of X and Y axes displacemental servo error signals. The action of the speed sustainer control system is to provide rotor sustaining torque by the variation of the amplitude and phase of the servo error signal in response to the rotor speed error signal $\omega_r$ in such a way that it diminishes to zero.

In operation, vehicle accelerations and angular rates tend to produce rotor displacements and precessions developing error signals within the capture system. These error signals are transformed from a system of electrode coordinates to gyro coordinates by the action of the resolver circuit 19.

The resultant position error signals, now voltage analogs of relative rotor position in gyro coordinates, are applied to the compensator and coupler 16. These circuits implement the desired type of positional servomechanism, determine the servo response and provide rate-dependent cross-axis coupling between the angular servos thus promoting gyroscopic quadrature rotor capture as covered in U.S. Pat. No. 3,902,374. A final function of the compensators within the lateral servos is to control sustaining rotor spin torque. The synthesizer 15 performs an antiresolution function combining gyro-referenced error signals to form electrode-referenced signals.

The modulator 13 receives from excitation circuit 12 a pair of carrier signals phase-locked at 90° with respect to one another and generates a composite output signal modulated in amplitude and phase by the input signal in such a manner that certain properties of the capture system are obtained. These properties are dealt with fully following this overall system description.

Electrode driver circuits 14, one for each electrode, apply to their respective electrodes a current proportional to the input voltage from their respective modulators effecting rotor capture. At an appropriate circuit point within each electrode driver, a voltage signal containing gap capacitance information and thence rotor displacement information is applied to a pickoff processor 17 along with the signal output from the modulator which are combined in a certain way to produce the desired error signal.

One of the main features of this invention is the technique whereby a displacemental error signal is extracted in the presence of force-producing current without interaction and is explained in detail.

The properties of the capture system and a detailed treatment of the essence of it are contained in this section.

Properties of the capture system are:

1. The sum of the displacement currents flowing from the capture electrodes to the rotor is null.

2. The electrostatic force acting on the rotor due to displacement current between any electrode and the rotor is independent of the magnitude of the rotor-electrode gap.

3. The vector sum of electrostatic capture forces restoring the rotor to the undisplaced position are in proportion to the displacement.

4. The algebraic sum of electrostatic forces tending to pull open the ring of the rotor is a constant and independent of rotor displacement.

5. The displacement signals generated by the reflected impedance pickoff means are unaffected by changes in capture electrode currents.

In order to prevent a voltage from existing on the rotor it is necessary that the net current entering the rotor be zero. Where a net charge exchange exists, capture forces tend to become dependent and non-linear with respect to rotor displacement limiting the load and rate capacity of the gyroscope.

This property is achieved by arranging the amplitudes and phases of the individual capture electrode currents such that they add vectorally to zero.

TABLE I

| Electrode $E_{xyz}$ | Control Current $i_{c(xyz)}$ | Complements of Control | | | Current | | Rotor Angular Velocity $\omega_r$ |
|---|---|---|---|---|---|---|---|
| | | $i_x$ | $i_y$ | $i_z$ | $i_{\theta x}$ | $i_{\theta y}$ | |
| | | | | | 0 | −1 | 0 |
| $E_{0y0}$ | $i_{c(0y0)}$ | −1 | 0 | −1 | +1 | 0 | 1 |
| | | | | | −1 | 0 | −1 |
| | | | | | 0 | −1 | 0 |
| $E_{0y1}$ | $i_{c(0y1)}$ | +1 | 0 | −1 | +1 | 0 | 1 |
| | | | | | −1 | 0 | −1 |
| | | | | | 0 | −1 | 0 |
| $E_{1y0}$ | $i_{c(1y0)}$ | −1 | 0 | +1 | +1 | 0 | 1 |
| | | | | | −1 | 0 | −1 |
| | | | | | 0 | −1 | 0 |
| $E_{1y1}$ | $i_{c(1y1)}$ | +1 | 0 | +1 | +1 | 0 | 1 |
| | | | | | −1 | 0 | −1 |
| | | | | | +1 | 0 | 0 |
| $E_{x00}$ | $i_{c(x00)}$ | 0 | −1 | −1 | 0 | +1 | 1 |
| | | | | | 0 | −1 | −1 |
| | | | | | +1 | 0 | 0 |
| $E_{x01}$ | $i_{c(x01)}$ | 0 | +1 | −1 | 0 | +1 | 1 |
| | | | | | 0 | −1 | −1 |
| | | | | | +1 | 0 | 0 |
| $E_{x10}$ | $i_{c(x10)}$ | 0 | −1 | +1 | 0 | +1 | 1 |
| | | | | | 0 | −1 | −1 |
| | | | | | +1 | 0 | 0 |
| $E_{x11}$ | $i_{c(x11)}$ | 0 | +1 | +1 | 0 | +1 | 1 |
| | | | | | 0 | −1 | −1 |

TABLE II

| Electrode Current $i_{xyz}$ | Polarity of Components of Electrode Currents | | |
|---|---|---|---|
| | Bias $i_b$ | Control $i_{c(xyz)}$ | Quadrature $i_{a(xyz)}$ |
| $i_{0y0}$ | + | + | + |
| $i_{0y1}$ | − | + | − |
| $i_{1y0}$ | + | − | + |
| $i_{1y1}$ | − | − | − |
| $i_{x00}$ | + | − | − |
| $i_{x01}$ | − | − | + |
| $i_{x10}$ | + | + | − |

TABLE II-continued

| Electrode Current $i_{xyz}$ | Polarity of Components of Electrode Currents | | |
|---|---|---|---|
| | Bias $i_b$ | Control $i_{c(xyz)}$ | Quadrature $i_{a(xyz)}$ |
| $i_{x11}$ | − | + | + |

Each electrode is operated with a current having a constant component $i_b$, a control component $i_c$ and a quadrature component $i_a$. The control component for each electrode is a composite of currents proportional to the error signals of the axes along or about which that electrode is effective in capturing the rotor. For example, referring to FIG. 6 which shows the capture electrode shells in relation to gyro coordinates, electrode $E_{x11}$ which has components of its effective surface area vector lying in the Y-Z plane, generates forces on the rotor along the Y and Z axes and torques about the X axis. Table I contains in tabular form the control components of current for all electrodes. 0; 1 and −1 indicate that the component does not appear, appears with positive sign or appears with negative sign in the expression for control current, respectively. Under the column headed Rotor Angular Velocity, 0, +1 and −1 indicate the rotor is at rest, at normal operating velocity and at reversed direction operating velocity, respectively. For example, the control component of current for electrode $E_{1y0}$ is $$i_{c(1y0)(\omega r = 0)} = -i_x + i_z - i_{\theta y}$$

for the rotor at rest whereas $$i_{c(1y0)\omega r = 1)} = -i_x + i_z + i_{\theta x}$$

for the rotor at normal operating speed.

In Table II the polarities of the bias, control and quadrature components for the total electrode currents are exhibited. For example, the current in electrode $E_{1y0}$ is $$i_{1y0} = i_b - i_{c(1y0)} + ji_{a(1y0)}$$

where $$i_{a(xyz)} = (i_b^2 - i_c^2{}_{(xyz)})^{1/2}.$$

Following the polarity assignments specified by Tables I and II and the defining equations, the vector sum of electrode currents for all values of $i_{c(xyz)}$, under the condition that $$|i_{c(xyz)}| \leq |i_b|,$$

is zero establishing the first property. The reason for the general format of electrode currents will become evident in establishing properties 3 and 4.

In pulsed d-c force rebalance systems, the second property was illustrated in U.S. Pat. No. 3,877,313. For a-c systems, consider the electrode-rotor circuit as a capacitor C the value of which varies inversely with the separation g between rotor and electrode.

When operated with an a-c current having a peak value $i_m$ frequency $\omega$, the voltage across the capacitor is $$V = \frac{i_m \sin\omega t}{j\omega C} = \frac{-i_m g \cos\omega t}{\omega \epsilon A}$$

where
$\epsilon$ = permittivity of dielectric
A = area of electrode
the field intensity E is $$E = \frac{V}{g} = \frac{-i_m \cos\omega t}{\omega \epsilon A}$$

and the resulting electrostatic force is $$F = \epsilon A E^2 = \frac{i_m^2 \cos^2\omega t}{\omega^2 \epsilon A}$$

which has an average value $$F_{avg} = \frac{i_m^2}{2\epsilon A \omega^2}.$$

The significance of this equation is that the force of attraction acting on the rotor is independent of the separation between it and the electrode. This permits closure of a positional capture servo based on conditions other than that directly affected by the force such as is required in gyroscopic quadrature capture.

Properties 3 and 4 are obtained by the application of constraints to the general capture system. Consider any axis passing through the origin of the coordinate system of FIG. 5 or 6. A set of electrode currents can be found which produce forces or torques on the rotor along or about this axis, the single exception being torques about the Z axis. Denote forces in the positive sense of this axis produced by set of currents $i_2$ as $F_2$ and those directed in the negative sense produced by $i_1$ as $F_1$. Consider a fractional displacement $\rho$ of the rotor along the positive direction. Constraining this system to the requirement that the restoring force shall be proportional to the displacement, one has $$F_1 - F_2 = K_f(I_1^2 - i_2^2) = K_g \rho$$

where
$K_f$ = force proportionality factor
$K_g$ = feedback gain of the system. Constraining the system such that the total forces acting on the rotor shall be a constant:

$$F_1 + F_2 = K_f(i_1^2 + i_2^2) = 4K_o^2 K_f$$

The reason for choosing the total force equal to $4K_o K_f$ will be evident shortly.
Choosing $$i_1 = i_b + i_c + ji_a$$

and $$i_2 = i_b - i_c - ji_a$$

the squares of the magnitudes are $$i_1^2 = (i_b + i_c)^2 + i_a^2$$

$$i_2^2 = (i_b - i_c)^2 + i_a^2$$

and the sum and difference of the squares of the magnitudes are $$i_1^2 + i_2^2 = 2(i_b^2 + i_c^2 + i_a^2)$$

$$i_1^2 - i_2^2 = 4i_b i_c$$

From above, $$2(i_b^2 + i_c^2 + i_a^2) = 4K_o^2.$$

If the choice is made that $$i_a^2 = i_b^2 - i_c^2$$

then $$i_b = K_o$$

and $$i_c = (K_g/4K_o K_f) \rho.$$

The significance of this last equation is that by the constraints imposed and selections made within this capture system a control current $i_c$ can be generated which is effective in producing an electrostatic force proportional to a variable of displacement $\rho$.

The significance of this system wherein the total force on the rotor is constant is that no deforming forces are applied to the rotor. Also the total power dissipated in the capture electronics is constant and independent of input conditions adding to the thermal stability of the gyroscope.

Means to generate signals having the formats required for this capture system are described in U.S. pat. No. 3,902,374.

The means by which an error signal essentially linearly related to the displacement of the rotor is generated is described in this section.

Figure 7:
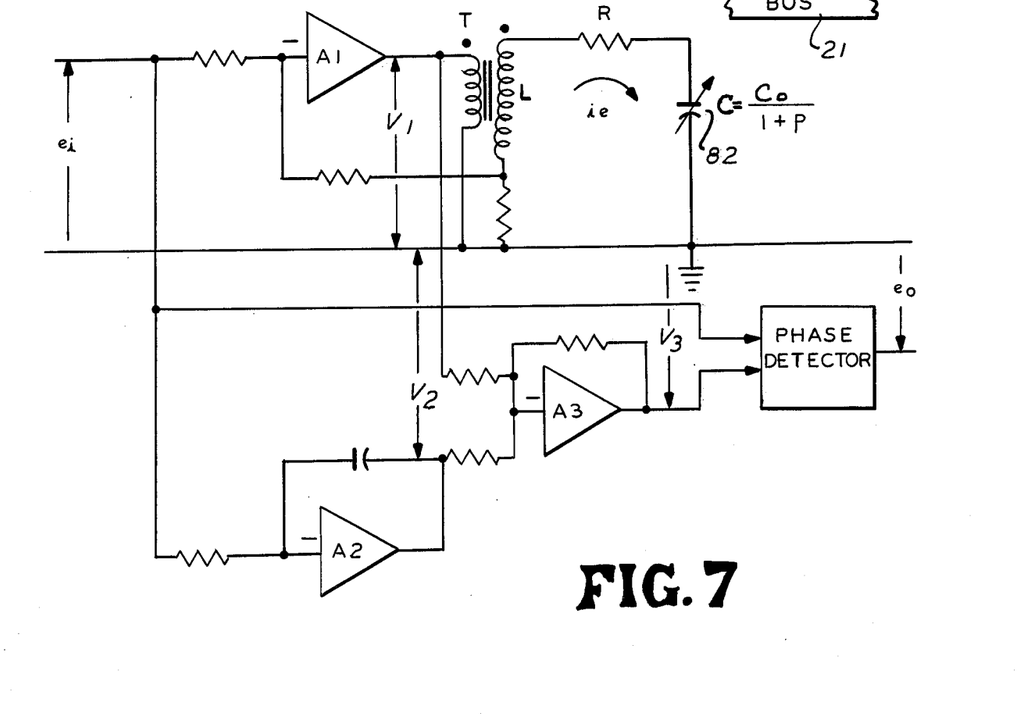
FIG. 7 is a schematic diagram of the electrode driver and pickoff processor.

FIG. 7 is a schematic diagram of both the electrode driver (upper half) and pickoff processor (lower half) associated with a capture electrode shown as the upper electrode of the variable capacitor. The bottom electrode of the capacitor is in actuality rotor 82 of the gyroscope which is maintained at ground potential as described previously. Relating FIG. 7 to FIG. 4, $e_i$ is the input common to both the electrode driver and the pickoff processor coming from the modulator, $i_e$ is the output current from the electrode driver to capture electrode within the gyroscope, $V_1$ is the voltage at the primary of the step up transformer which is fed from electrode driver 14 to the pickoff processor 17 and $e_o$ is the output of the pickoff processor fed to resolver 19.

With the rotor in the center of its range of capture, it forms a cpacitance of value $C_o$ with the capture electrode and is separated from it by a distance $X_o$. For displacement of the rotor away from the electrode, $$C = \epsilon A / X_o + X),$$

the fractional displacement is $$\rho = X/X_o$$

and the equation for the gap capacitance in terms of this variable is $$C = C_o/(1 + \rho).$$

Those trained in the art of feedback amplifier design will recognize that the circuitry associated with amplifier A1 generates a displacement current $i_e$ in C which is maintained proportional in amplitude and equal in phase to the input voltage $e_i$. Moreover, $i_e$ is invariant with $\rho$.

By selecting the secondary inductance L to resonate with $C_o$ at the carrier frequency $\omega_c$, the voltage at the primary can be expressed.

$$V_1 = K[1 - jQ(1 + \rho)]e_i$$

where $Q =$ quality factor of the resonant circuit and $K$ is the gain. By multiplying through $$V_1 = Ke_i - jKQe_i - jKQ\rho e_i.$$

Amplifier A2 with its input and feedback elements comprises a circuit having the property of shifting the phase of the input sinusoid by 90 electrical degrees. The gain factor is chosen to be KQ such that $$V_2 = jKQe_i.$$

Now A3 and its input and feedback resistors form an inverting summing amplifier. Summing $V_1$ and $V_2$ $$-V_3 = Ke_i - jKQ\rho e_i$$

the phase detector generates an output voltage proportional to the phase between $-V_3$ and $e_i$ which is expressed $$e_o = \tan^{-1} Q\rho.$$

Figure 8:
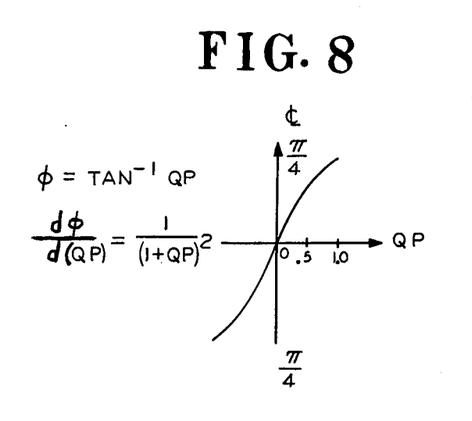
FIG. 8 is a graph of the arctangent function.

A plot of this function is shown in FIG. 8 illustrating that excellent linearity exists about the origin corresponding to the undisplaced position. For typical values of $\rho = 0.1$ and $Q = 5$, the effective gain change from null is 20%, quite adequate for null-seeking positional servo applications. The last property of this capture system, i.e., independency of the displacement signal from electrode current, is established in that displacement information is contained as phase whereas electrode current is proportional to amplitude, which does not affect phase.

It is believed apparent that many changes could be made in the construction and described uses of the foregoing invention without departing from the scope thereof. For example, the different electrode configurations and placements employed in the electrostatic suspension and capture techniques described could be used in a single axis gyroscope, directional gyroscopes or other inertial devices. Accordingly, it is intended that all matter contained in the above description and shown in the accompanying drawings shall be interpreted as illustrative and not in a limiting sense.

What is claimed is:

1. An electrostatic gyroscope having two input axes and a spin axis comprising:
    an electrode structure,
    a rotor disposed about said electrode structure,
    means for capturing said rotor along three orthogonal axes in displacement and about said two input axes of said orthogonal axes in rotation,
    means to impart a rotation to said rotor and to sustain said rotation at a predetermined rate said rotation being about said spin axis of said orthogonal axes,
    mounting means on said electrode structure providing two degree-of-freedom rotational compliance about said two orthogonal axes about which said rotor is captured rotationally, and
    means responsive along said two orthogonal axes about which said rotor is captured rotationally coupled to said electrode structure constraining said electrode structure in place in the presence of gyroscopic reaction torques and providing output signals representative of input rate.

2. The gyroscope of claim 1 comprising:
    a generally annular rotor having the shape of the surface of the frustra of two equal right circular cones which have their smaller circular bases in common said rotor being formed of electrically conductive material and being responsive to said capture means acting on radially interior surfaces of said rotor and to said rotation means acting on the radially exterior surfaces of said rotor.

3. The gyroscope as claimed in claim 2 wherein said capture means comprises:
    a plurality of electrodes contained on the radially exterior surfaces of said electrode structure opposing the radially interior surfaces of said rotor and separated from it by a dielectric medium,
    means for operating each electrode such that an alternating displacement current flows between each electrode and the rotor,
    means for processing the alternating voltage present in each electrode circuit in a prescribed manner with an alternating voltage proportional to said alternating displacement current flowing in that electrode to produce displacement voltages in electrode coordinates,
    means for transforming said displacement voltages from a system of electrode coordinates to a system of gyro coordinates producing signals related to gyro rotor displacement,
    means for applying compensation to said gyro rotor displacement voltages appropriate to the order and type of the desired stabel servomechanisms,
    means for transforming said compensated signals from a system of gyro coordinates back to a system of electrode coordinates,
    means for modulating alternating current carriers with said transformed compensated signals, and
    means for increasing the amplitude of said modulated carriers and their introduction as alternating displacement currents between each electrode and the rotor thus closing the loop of a five degree-of-freedom positional servomechanism.

4. The gyroscope of claim 3 wherein the sum of said alternating displacement currents flowing from each electrode to the rotor is substantially zero, said summation being by vector addition.

5. The gyroscope of claim 3 wherein said capture means comprises:
    means for providing electrostatic restoration forces which are essentially proportional to rectilinear displacements along said three orthogonal axes, and
    means for providing electrostatic restoration torques essentially proportional to rotational displacements about said input axes all of said forces and displacements being with respect of the rotor to the electrode structure.

6. The gyroscope according to claim 3 comprising:
    means to provide electrostatic forces acting on said rotor resolved along any positive axis passing through the center of volume of said rotor said forces when summed arithmetically with electrostatic forces resolved along the negative direction of said axis producing essentially a constant force.

7. A gyroscope according to claim 3 wherein said means for processing the alternating voltage present in each electrode circuit in producing displacement voltages in electrode coordinates is independent of the magnitude and phase of the alternating displacement current flowing between each electrode and the rotor.

8. The gyroscope according to claim 3 wherein the means for operating each electrode with a displacement current comprises:
   a current amplifier for producing in the capacitance that is formed by an electrode opposing said rotor having a dielectric gap therebetween, a current proportional to the input voltage of said current amplifier said current being independent of the magnitude of said gap.

9. A gyroscope according to claim 8 wherein the means for processing said alternating voltage to produce a displacement voltage in electrode coordinates comprises:
   said current amplifier comprising a circuit containing the secondary inductance of a step-up transformer, resistance and a capacitance presented by an electrode opposing said conductive rotor at virtual ground potential separated by a vacuum dielectric medium said circuit tuned to series resonance with said rotor in its undisplaced position and the quality factor of said circuit being fixed by the value of said resistance,
   means to subtract from the voltage appearing at the primary of said transformer a voltage proportional to said current amplifier input voltage but shifted in phase by one quadrant, and
   means to detect the phase of the voltage resulting from said subtraction using said input voltage as a reference.

10. A gyroscope as claimed in claim 1 wherein said means to sustain said rotation includes:
    a rotor having a center of volume and a center of mass displaced from one another in the plane of said gyroscope input axes by a small amount said rotor revolving about an axis which passes through neither said center of volume through which suspension forces act nor through said center of mass through which inertial forces act but about an axis colinear with the spin axis of the gyroscope.

11. A gyroscope as claimed in claim 10 wherein:
    said electrostatic suspension means being further adapted to include within said means for applying compensation appropriate to the order and type of a desired stable servomechanism means to vary a portion of said compensation within the angular capture servomechanism in response to said first and second results of rate comparison.

12. A gyroscope according to claim 11 wherein said variation of a portion of said compensation effects a change in the magnitude and direction of the torque about the spin axis of said rotor, said change in such a direction so as to produce
    accelerating torque when said selected rotor speed is less than said actual rotor speed,
    decelerating torque when said selected rotor speed is greater than said actual rotor speed, and
    speed-sustaining torque when said selected and said actual rotor speeds are equal said torque being available by virtue of the existence of a lever arm equal in length to the perpendicular distance between said center of volume and said spin axis multiplied by that net electrostatic force produced by said suspension means perpendicular to said lever arm.

13. A gyroscope as claimed in claim 12 wherein said means to impart a rotation comprises:
    a plurality of raised segments on the radially outward surface of said rotor,
    a plurality of electrodes opposing said raised segments,
    means for sensing a rate of rotation of said rotor about said spin axis,
    means to energize selected sets of said electrodes according to a sequence said means being adapted to be responsive to said means for sensing a rate of rotation,
    means to compare said actual rate of rotation with selected rates such as operating rates or zero rate, and
    means to activate and deactivate said energizing means said energizing means being further adapted to be responsive to said selected rates.

14. A gyroscope according to claim 13 wherein said means to compare said actual rate of rotation with a selected rate comprises:
    means for varying the magnitude proportional to the magnitude of the inequality between actual rate and selected rate, and
    means for deriving a polarity of said magnitude which bears a one-to-one relationship with the sense of said inequality.

* * * * *